Dec. 22, 1964 W. P. CASEY, JR 3,162,218
TANK FILLING APPARATUS
Filed Sept. 14, 1961
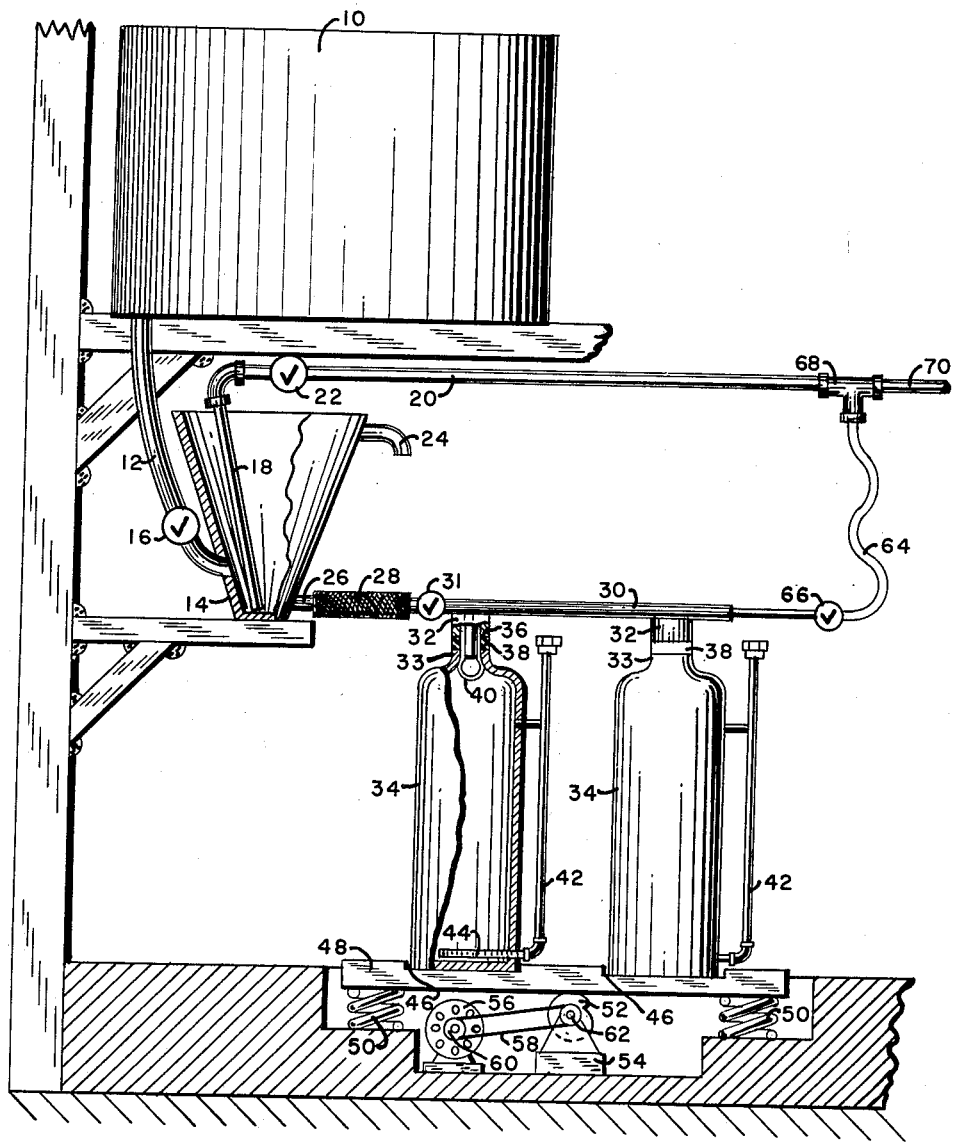
INVENTOR.
Walter P. Casey Jr.
BY
Agent

United States Patent Office 3,162,218
Patented Dec. 22, 1964

3,162,218
TANK FILLING APPARATUS
Walter P. Casey, Jr., Las Vegas, Nev., assignor to Pier, Inc., Las Vegas, Nev., a corporation of Nevada
Filed Sept. 14, 1961, Ser. No. 138,187
5 Claims. (Cl. 141—72)

This invention relates to apparatus for filling tanks, and more particularly to apparatus for filling portable tanks with ion exchange resin particles.

Relatively small portable tanks are employed to contain a bed of ion exchange resin particles in home water softening systems. Such tanks are connected into the home water supply. When the contained resin is spent, that is its water softening capability reduced below an effective value, a tank is disconnected and replaced with a tank containing regenerated, fresh resin for an additional period of service. The tanks containing spent resin are collected and trucked to a central plant where the resin is regenerated, and the tanks re-filled with regenerated resin ready for replacement again in home water softening systems.

Filling the portable tanks with a water slurry of resin particles is not easy to efficiently and readily accomplish because of the tendency for the resin particles to settle out of suspension and cake in filler pipe lines and associated devices. Flushing such pipe lines with water alleviates settling problems but has heretofore been unsatisfactory due to the fact that the resin in the filled tank should be as dense as possible, that is should contain a minimum amount of water, for most efficient, long time use.

A principal object of this invention is therefore to provide improved apparatus for filling a portable tank with an aqueous slurry of ion exchange resin particles. A further object of this invention is to provide apparatus for filling a portable tank with an aqueous slurry of ion exchange resin particles and compacting the resin particles so as to obtain a dense bed of resin particles. These and other objects of this invention will be apparent from the following description thereof and from the annexed drawing in which:

The figure shows a general side view of apparatus embodying features of this invention.

Referring now to the figure the apparatus comprises supply means including tank 10 preferably elevated as shown to provide a hydraulic head of resin and water mixture. Leading from the bottom of tank 10 is supply pipe 12 which supplies resin water mixture from tank 10 into feed box 14, the flow through pipe 12 being controlled by valve 16. Feed box 14 is constructed with upwardly flaring sides as shown and is provided with water injector pipe 18 which provides an upward flow of water near the bottom of feed box 14 to prevent settling out of resin particles. Injector pipe 18 is connected to water line 20 through which the flow is controlled by valve 22. An overflow outlet 24 is arranged near or at the top of feed box 14 so that water, or resin water mixture may drain if the feed box 14 should become overfilled or if it is desired to drain off supernatant water. An outlet pipe 26 is provided at or near the bottom of feed box 14 and this is connected to one end of a section of flexible hose 28, the other end of flexible hose 28 being connected to distributor pipe 30, valve 31 controls the flow through distributor pipe 30. In the bottom of distributor pipe 30 are arranged a series of connectors in the form of outlet tubes 32, spaced along its length, which are designed to mate with the open mouths 33 of portable tanks 34. Outlet tubes 32 are each provided with a shoulder 36 against which abuts a flexible gasket 38 to seal the tube 32 to the mouth of tank 34. Tubes 32 are also provided with means, as spring members 40, to retain the tubes 32 in snug sealing engagement, temporarily firmly attached to the mouths of tanks 34 during filling.

Tanks 34 are of conventional design used as portable supply tanks for water softening, and each is provided with side arm pipe 42 which is connected internally to screen element 44 so that water may flow in and through the tank and out pipe 42 but resin will be retained in the tank by action of screen 44.

Tanks 34 stand in indentations 46 in plate 48 which is resiliently mounted, so as to be movable vertically, by springs 50. Plate 46 is also supported at its center by cam 52 which is rotatably mounted on its base 54 and is rotated by motor 56 driving through belt 58 and pulleys 60 and 62.

The free end of distributor pipe 30 is connected to flexible water line 64 which is controlled by valve 66 and which is in turn connected at 68 to a water supply pipe 70. This provides means for back flushing distributor pipe 30 between filling operations. Feed box water pipe 20 is also connected at 68 to the same supply pipe 70 as shown.

In operation of the apparatus shown in the figure, the supply tank 10 is first provided with a supply of resin particles in water. A plurality of portable tanks 34 are then placed in their respective indentations 46 in plate 48 and distributor pipe 30 is lowered in place so that its outlet tubes 32 mate with the open mouths 33 of tanks 34. Gaskets 38 seal the mating of outlets 32 to tank mouths 33, the outlets 32 being temporarily firmly attached in snug mating engagement with the mouths 33 by spring member 40 as shown.

Valve 16 is then opened to allow resin-water slurry to flow from supply tank 10 into feed box 14 and a flow of water is arranged out of the end of injector pipe 18 by opening, to an appropriate degree, valve 22. The flow of water out of injector pipe 18 stirs up and suspends the resin to make it flow readily and to prevent its settling and caking the transfer pipes. The resin suspended with some excess water (more than in a settled or compacted mass) flows through flexible hose 28 and into distributor pipe 30, valve 66 being normally closed. Meanwhile, motor 56 has been started to rotate cam 52 thereby to produce an up and down motion to plate 48 resulting in jolting of portable tanks 34. As the resin water slurry flows through distributor pipe 30 it flows down through outlets 32 into the portable tanks 34 being jolted and compacted by the jolting action in portable tanks 34. Excess water drains out of side arm pipe 42 while the resin particles are retained in the tank by the action of filter or screen element 44.

When sufficient resin water slurry has been introduced to fill portable tanks 34 with a well-compacted, dense, bed of resin particles, valve 16 is closed and valve 22 is opened to provide a back flow of water through distributor pipe 30 to back flush resin particles up into feed box 14. Valve 31 is then closed and valve 22 shut off. The free end of distributor pipe 30 is then raised, this being readily accomplished since flexible hose 28 acts as a hinge member, outlets 32 thus being freed from the mouths 33 of portable tanks 34. The filled tanks are then removed from plate 48 and replaced with additional empty tanks and distributor pipe 30 lowered in place as before to mate outlets 32 with tank mouths 33. Valves 16 and 22 are opened again, motor 56 restarted and the new tanks filled with resin as before.

The flow of water from injector pipe 18 may be adjusted so that this need not be shut off each time a batch of filled tanks is removed and replaced with empties. The resin itself suspended in feed box 14 can be regulated so that it forms a more or less definite level below the overflow drain 24 so that excess water may drain off without appreciable loss of resin particles.

The jolting action of the portable tanks during filling enables these to be efficiently filled with a closely packed, dense bed of resin particles. Thus, the greatest possible amount of resin is introduced into each tank resulting in longer life before replacement for regeneration in service is required. At the same time the jolting action appears to assist in keeping the resin particles in suspension in the distributor pipe which will be subjected to the same action as the tanks, as will be apparent. The flexible hose connector at the end of the distributor pipe allows for movement of the distributor pipe with the tanks.

The water flow, introduced into the feed box, also assists in keeping the resin particles in suspension to prevent settling and caking in the distributor pipe and outlets. The water thus introduced dilutes the resin slurry but this does not affect efficient filling of the tanks due to the packing action of the jolter arrangement. Thus, the combination described, forming the apparatus of this invention, provides a diluted suspension of resin particles for efficient and free passage through the distributor pipe and filling outlets and also provides ready and efficient packing of the resin particles to form a dense, compacted bed in the tanks as filled.

I claim:

1. Apparatus for filling a portable tank having a mouth and an outlet provided with a retaining screen with an aqueous slurry of ion exchange resin particles comprising; supply means leading from a supply of said aqueous slurry of ion exchange resin particles, a rigid distributor pipe connected to said supply means by a section of flexible hose, a support member resiliently mounted underneath said distributor pipe, a tank connector communicating with said distributor pipe adapted to be temporarily firmly attached to the mouth of a portable tank standing on said support member, and means for jolting said support member which in turn jolts a portable tank standing thereon and the said distributor pipe attached thereto during flow of aqueous slurry of ion exchange resin particles from said supply means, through said section of flexible hose, said distributor pipe and said tank connector into said portable tank.

2. Apparatus for filling a portable tank having a mouth and an outlet provided with a retaining screen with an aqueous slurry of ion exchange resin particles comprising; supply means leading from a supply of said aqueous slurry of ion exchange resin particles, said supply means including a feed box having a supplementary water inlet pipe to provide an upward flow of water therein, a rigid distributor pipe connected to said feed box by a section of flexible hose, a support member resiliently mounted underneath said distributor pipe, a tank connector communicating with said distributor pipe adapted to be temporarily firmly attached to the mouth of a portable tank standing on said support member, and means for jolting said support member which in turn jolts a portable tank standing thereon and the said distributor pipe attached thereto during flow of aqueous slurry of ion exchange resin particles from said supply mean, through said section of flexible hose, said distributor pipe and said tank connector into said portable tank.

3. Apparatus for filling a portable tank having a mouth and an outlet provided with a retaining screen with an aqueous slurry of ion exchange resin particles comprising; supply means leading from a supply of said aqueous slurry of ion exchange resin particles, said supply means including a feed box having flaring sides and having a supplementary water inlet pipe to provide an upward flow of water therein, a rigid distributor pipe connected to said feed box by a section of flexible hose, a support member resiliently mounted underneath said distributor pipe, a tank connector communicating with said distributor pipe adapted to be temporarily firmly attached to the mouth of a portable tank standing on said support member, and means for jolting said support member which in turn jolts a portable tank standing thereon and the said distributor pipe attached thereto during flow of aqueous slurry of ion exchange resin particles from said supply means, through said section of flexible hose, said distributor pipe and said tank connector into said portable tank.

4. Apparatus for filling a portable tank having a mouth and an outlet provided with a retaining screen with an aqueous slurry of ion exchange resin particles comprising; supply means leading from a supply of said aqueous slurry of ion exchange resin particles, a rigid distributor pipe connected to said supply means by a section of flexible hose, a support member resiliently mounted underneath said distributor pipe, a tank connector communicating with said distributor pipe adapted to be temporarily firmly attached to the mouth of a portable tank standing on said support member, and means for jolting said support member which in turn jolts a portable tank standing thereon and the said distributor pipe attached thereto during flow of aqueous slurry of ion exchange resin particles from said supply means, through said section of flexible hose, said distributor pipe and said tank connector into said portable tank, and means for back flushing said distributor pipe with water between filling operations.

5. Apparatus for filling a plurality of portable tanks having a mouth and an outlet provided with a retaining screen with an aqueous slurry of ion exchange resin particles which comprises; supply means leading from a supply of said aqueous slurry of ion exchange resin particles, a rigid distributor pipe attached to said supply means by means of a section of flexible hose, a support member resiliently mounted underneath said distributor pipe, a series of spaced tank connectors in the bottom of said distributor pipe adapted to be temporarily firmly attached to the mouths of a plurality of portable tanks standing on said support member, and means for jolting said support member which in turn jolts the said portable tanks standing thereon and the said distributor pipe attached thereto during flow of aqueous slurry of ion exchange resin particles from said supply means through said section of flexible hose, said distributor pipe and said tank connectors into said portable tanks.

References Cited by the Examiner
UNITED STATES PATENTS

| | | | |
|---|---|---|---|
| 222,219 | 12/79 | Wilder | 141—116 |
| 1,147,861 | 7/15 | Hennebohle | 141—62 X |
| 2,653,116 | 9/53 | Whitcomb et al. | 134—169 XR |
| 2,708,055 | 5/55 | Alexander | 141—242 X |
| 2,779,510 | 1/57 | Wilson et al. | 222—196 X |
| 2,791,246 | 5/57 | Schmitt | 141—237 |
| 2,850,046 | 9/58 | Sullentrop | 141—72 XR |

LAVERNE D. GEIGER, *Primary Examiner.*